United States Patent Office 3,558,534
Patented Jan. 26, 1971

3,558,534
MOLDING EXPANDABLE ALKENYL
AROMATIC POLYMER BEADS
Michal Niechwiadowicz, 80 Clover Leaf Road, and Arnold B. Finestone, 20 Grove Ave., both of Leominster, Mass. 01453
No Drawing. Continuation-in-part of application Ser. No. 640,396, May 22, 1967. This application Mar. 21, 1969, Ser. No. 809,378
Int. Cl. C08f 47/10; C08j 1/26
U.S. Cl. 260—2.5          8 Claims

ABSTRACT OF THE DISCLOSURE

Expandable alkenyl aromatic polymers which do not acquire or retain a static charge are prepared by incorporating a small amount of rubbery polymer into the expandable polymer.

---

This application is a continuation-in-part of copending application Ser. No. 640,396, filed May 22, 1967, now abandoned.

This invention relates to expandable compositions having utility in various manufactured articles. More particularly it relates to such thermoplasitc compositions formed from alkenyl aromatic polymers obtained from corresponding monomers having a small amount of rubbery polymer dissolved therein.

The term alkenyl aromatic polymers includes thermoplastic polymers and copolymers containing in chemically combined form at least 55% by weight of a monoalkenyl aromatic compound having the general formula:

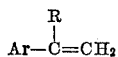

wherein Ar represents a monovalent aromatic radical and R represents hydrogen or the methyl radical. Examples of such alkenyl aromatic resins are the solid homopolymers of styrene, alpha-methyl styrene, ar-vinyl toluene, ar-vinyl xylene, and ar-ethylvinyl benzene; the solid copolymers of two or more of such alkenyl aromatic compounds with one another; and solid copolymers of one or more of such alkenyl aromatic compounds with a minor amount of another polymerizable olefinic compound.

Polystyrene containing pentane or the like is used in making molded articles and in the preparation of expanded cellular insulation, but for many uses it has the disadvantage of acquiring and retaining a static charge which makes it difficult to handle and quite dangerous because of its ability to discharge and cause serious explosions. Attempts to produce such compositions without this disadvantage have resulted in an undesirable decrease in important properties of the polymer, such as poor shelf life, lumping during pre-expansion, excessive water pick-up and clumping during pre-expansion, coarse and non-uniform cell structure in the pre-puff, and poor molding characteristics (poor fusion, poor mold fill, slow setting, long cooling cycle, collapse or post expansion of the molded article or combinations thereof).

The foregoing and other disadvantages are obviated by the present invention, an object of which is to provide new, expandable styrene polymer materials having a fine, uniform cell size and which do not readily acquire or retain a static charge. A further object of the invention is to provide a process by means of which such styrene polymer materials can be prepared in a convenient way. A specific object of the invention is to provide expandable styrene polymer materials containing a small amount of rubbery polymer reacted therein and a process for the production of such styrene polymer materials. Other objects of the invention will be obvious in view of details or embodiments of the invention as set forth hereinafter.

These objects are achieved by providing styrene polymers or the like having a very small amount of rubbery polymer uniformly distributed throughout. It is preferred to add the said rubbery polymer to the monomeric styrene or the like and to polymerize this mixture in accordance with usual suspension polymerization methods. In this way neither the molecular weight nor the softening range of the styrene or the like polymer material is undesirably altered.

The following examples illustrate ways in which the principles of the invention are applied, but are not to be construed as limiting its scope. The parts and percentages specified in the examples are parts and percentages by weight, unless otherwise indicated.

EXAMPLE 1

There are charged into a jacketed vessel equipped with an agitator 100 parts of de-ionized water. Next, the agitator is started and its speed is set at a rate necessary to keep the oil phase dispersed into droplets whose diameter ranges between 0.25 and 2.5 mm. The water temperature is then raised to 195° F. and 91.425 parts of styrene, 0.50 part of styrene-butadiene elastomer with about 23% of bound styrene 0.24 part of benzoyl peroxide and 0.085 part of 2,5-dimethyl-2,5-bis(benzoyl peroxy) hexane are added thereto. The elastomer is dissolved in styrene before being added. Next, 0.05% of polyvinyl alcohol based on the weight of the total charge is added (as an aqueous solution) to the reactor charge, and polymerization is carried out at 195° F. At a polymer content in the polymerizing oil phase of about 70%, the reactor is pressurized to 15 p.s.i.g. with nitrogen and pentane (7.75 parts) is added thereto over a period of 10 minutes and the reaction is continued for 2 hours, after which the reaction temperature is raised to 240° F. and polymerization is continued for another 5 hours. Lastly, the contents of the reactor are cooled to below 125° F., washed and dried.

The product has the following desirable properties:
(a) Almost a complete absence of static charges:—this makes the product easy to screen.
(b) Less tendency to form lumps during pre-expansion, relative to a control product containing no elastomer.
(c) The pre-expanded particles have very fine and uniform cell size.
(d) Improved molding characteristics; good fusion and no collapse in the molded articles.
(e) Longer shelf life of the pre-puff; good quality molded, low density articles are obtained 16 days after the pre-expansion.

EXAMPLE 2

The procedure of the Example 1 is repeated using 91.675 parts of styrene (instead of 91.425) and 0.25 part of the styrene-butadiene elastomer (instead of 0.50).

This product is also of good quality and similar to the product of the Example 1. However, it displays a tendency to develop a noticeable, though not objectionably high, static charge.

(Comparative) Example A

The procedure of Example 1 is repeated using 91.80 parts of styrene (instead of 91.425) and 0.125 part of the styrene-butadiene elastomer (instead of 0.50).

This product is not substantially better than a control product containing no elastomer.

EXAMPLE 3

The procedure fo Example 1 is repeated using 0.5 part of a polybutadiene sold under the trademark Taktene 1202, and which has at least 95% of the butadiene units in the cis, 1,4- form instead of 0.50 part of the styrene-butadiene elastomer.

This product possesses the good qualities of the product of the Example 1, however, it shows a tendency to acquire a slight static charge upon vigorous shaking.

Comparable results to the foregoing are achieved by various modifications thereof, including the following. The present invention is employed to polymerize a charge consisting of at least 55%, and preferably 70 to 100%, of at least one monoalkenyl aromatic monomer compound. Up to 45% of the monomer can be another ethylenically unsaturated compound copolymerizable with the monovinyl aromatic compound. The monovinyl aromatic compound is preferably styrene although vinyl naphthalenes or other vinyl aryl compounds or their substitution derivatives may also be employed. Examples of substituded vinyl aryl compounds include: halogenated styrenes such as mono- and di-chloro, mono- and di-bromo, or fluorostyrenes; alkyls, alkenyl, aryl, aryl-alkyl, alkyl-aryl and cyclo aliphatic substituted materials, as for example mono- and dimethyl-styrene, and ethyl-styrene. A combination of monovinyl aromatic compounds can also be employed. The ethylenically unsaturated compound copolymerizable with the monovinyl aromatic can include any of a variety of monomers known to be copolymerizable with vinyl aryl compounds. Examples thereof include the esters (preferably the alkyl esters) of acrylic acids, methacrylic acids and itaconic acid, such as eithy acrylate, methyl methacrylate, and the like, the nitrile derivatives of acrylic and methacrylic acids, e.g., acrylonitrile, methacrylonitrile, and the like, all of which are well known in the art for the purposes of copolymerizing with monovinyl aromatic compounds. The polymerization of styrene monomer is preferred.

The rubbery polymer may typically be one or more of the group comprised of natural rubber, styrene-butadiene elastomer having from 5 to 45% bound styrene, polybutadiene, synthetic polyisoprene, butadiene-acrylonitrile copolymer with up to 48% bound acrylonitrile and the like. The preferred rubbery polymer is styrene-butadiene copolymer.

The amount of the rubbery polymer is critical, and is about 0.25 to 0.90% and preferably about 0.40 to 0.75% based on the weight of the product. Higher amounts give an unsatisfactory product, especially as to non-uniform cell size in the pre-puff and the inability to pre-expand to a sufficiently low bulk density. Lesser amounts than about 0.25% of the rubbery polymer give a product with no meaningful reduction in static charge on the pre-puff.

The process is initiated by dispersing a solution of the rubbery polymer and monomer in water with the initial stages of the polymerization being conducted at temperatures under 100° C., preferably at temperatures within the range of 70° to 95° C. It is preferred to employ polyvinyl alcohol as the suspending agent, although other conventional suspending agents can be employed, such as tricalcium phosphate or other difficultly soluble phosphates, calcium carbonate, carboxymethyl cellulose, hydroxyethyl cellulose, polyvinylpyrrolidone, aluminum oxide, magnesium silicate, magnesium hydroxide, and the like, all of which are well known for this purpose. It is preferred to add the suspending agent on a delayed basis, i.e., when the conversion has reached about 20 to 55%, which normally will be about 1½ to 5 hours after the polymerization reaches the desired polymerization temperature, e.g., ordinarily about 70° to 95° C. The pH of the suspension may be varied depending on the suspending agent employed, e.g., pH of 6 or greater for tricalcium phosphate. When 50 to 80%, preferably 60 to 75% conversion, has been obtained, the volatile liquid blowing agent is added rapidly to the reaction system in a period of 2 to 30, preferably 5 to 20 minutes.

Suitable volatile liquid blowing agents generally having boiling points of from about 15 to approximately 100° C. are employed. Such agents are well known in the art. "Petroleum ethers" are particularly preferred, with those boiling within the range of 35° to 65° C. conventionally known as the "pentane" fraction being especially suitable. Such a fraction generally contains at least 70% normal pentane. Petroleum ethers boiling in the range of 65° to 72° C. denoted as the "hexane" fraction and those boiling in the range of 95° to 100° C. denoted as the "heptane" fraction, may also be used. Similarly useful are pure hydrocarbons boiling in the range of 15° to 100° C., such as for example, pentane, hexane, heptane, cyclopentane, and the like, or mixtures of such hydrocarbons as occurs in the petroleum ether fractions.

The volatile organic compound can be a liquid or gas at ordinary temperatures and pressures, i.e., at atmospheric conditions. The compound should be a nonsolvent or poor solvent of the polymer. It should have a molecular weight of at least 56 or greater and a molecular size such that it does not readily diffuse from the solid polymer.

The product generally has about 3 to 10, preferably about 4 to 8% of the volatile blowing agent incorporated therein. The quantity of blowing agent can be varied and is sufficient to cause the desired degree of expansion by the end users. Since there is generally little loss of volatile blowing agent, the amount of blowing agent added is about 3 to 10 weight percent of the monomer employed.

Just prior to the addition of the volatile liquid blowing agent, the reactor may be pre-pressured with an inert and non-condensable gas to insure avoidance of undesired porosity or voids in the polymer particles. Alternatively this pressurization may be effected immediately after the addition of the volatile liquid blowing agent and before the bulk of the blowing agent has been absorbed by the polymer beads.

Thereafter the second stage of the polymerization is effected at temperatures of about 95° C. or above, desirably in the range of 95° to 145° C. especially 95° to 140° C.

As is conventional, a catalyst or initiator is added to promote the first stage polymerization. Typical examples of such initiators are benzoyl peroxide and its derivatives, such as para-chlorobenzoyl peroxide, and the like. To help catalyze the second stage of the polymerization further amounts of peroxide catalysts may be added to the polymerization zone. The second stage catalyst may be added at the beginning or at the latter part of the first stage polymerization, and preferably the peroxide catalyst is added along with the blowing agent, especially if the catalyst is soluble in the blowing agent. If the initiator is benzoyl peroxide or a similar initiator which readly reacts at temperatures under 100° C., the initiator for the second stage of polymerization must be added at or about the beginning of the second stage for catalysis of the second stage polymerization to be effective.

However, in another embodiment of the present invention, a second catalyst having a half-life value considerably higher than that of benzoyl peroxide can be used to promote the second stage reaction. In this embodiment, the second stage catalyst has a half-life value of more than 1 hour at 100° C. in benzene (preferably about 3 hours, in contrast to the 0.4 hour half-life value of benzoyl perovide at 100° C. in benzene). In this embodiment the catalyst can be added at the beginning of polymerization or prior to the second stage reaction, since it will not substantially decompose at temperatures of 80° to 95° C. as used in the first stage polymerization, but will only exercise its catalytic effect at the higher temperatures (which characterize the second stage of polymerization).

Examples of such preferred second stage catalysts are tertiary butyl peracetate, cyclohexanone peroxide, and the like.

The second stage polymerization which takes place generally at temperatures of 95° C. to 145° C. is conducted to effect virtually 100% complete conversion. After completion of the polymerization, the polymerization mixture is cooled in the reactor so as to preclude premature expansion of the expandable particle upon discharge from the reactor. The products formed in accordance with the present process are polymer beads, capable of expansion upon heating with steam, or the like. The beads may then be removed from the polymerization mixture, washed thoroughly, and dried following conventional processing techniques.

Where all the advantages of the invention are not required, alternative polymerization procedures may be used, as known in the art, including bulk polymerization with simultaneous or supplemental addition of blowing agent, and comminution of any solid material as desired, in known manner.

In general the first stage polymerization conducted at temperatures of less than 100° C. is effected for periods of 2 to 10 hours, depending upon catalyst, to obtain 50 to 90% conversion. The second stage polymerization is preferably conducted at temperatures above about 95° C. to complete the polymerization after addition of the volatile liquid blowing agent, and is generally effected over a period of 1 to 10, preferably 3 to 5 hours, as required.

If desired, general self-extinguishing agents, anti-coalescing agents and the like may be included. A desirable self-extinguishing agent is tetrabromobutane. For best results, 0.6 to 0.9% is used based on the weight of the polymer in the final composition. A wider range of 0.4 to 2.0% is usable, especially with the higher proportions of blowing agent; and 0.5 to 1.5% is a practical range for use with a median concentration of blowing agent.

The anti-coalescing agents are characterized in that they do not have a deleterious effect on the expanded resin particles or the final product. Examples of such anti-coalescing agents are magnesium stearate, zinc stearate, calcium stearate, sodium stearate, aluminum stearate, butyl stearate, stearic acid, sodium oleate, talc, tricalcium phosphate, potassium lauryl sulfate, diatomaceous earth, and combinations of two or more thereof.

Polymerization of the monomers can be effected in the presence of various other agents to provide an ultimate polymer product containing such an agent or agents. Examples of such other agents include dyes, plasticizers and the like.

Having described the present invention, that which is sought to be protected is set forth in the following claims.

We claim:

1. A process for preparing an expandable alkenyl aromatic polymer composition having little or no static charge comprising 3.0 to 10.0% of a volatile blowing agent and about 0.25 to 0.90% of a rubbery polymer, said percentages being based on the weight of the product, which process comprises polymerizing the corresponding aromatic monomer material having in solution said rubbery polymer and introducing said blowing agent when about 50 to 80% of the monomer has been converted to polymer.

2. The process of claim 1 wherein the rubbery polymer is present in an amount of about 0.40 to 0.75 based on the weight of the product.

3. The process of claim 1 wherein the aromatic polymer is of at least 75% styrene and the blowing agent is present in an amount of about 4 to 8% based on the weight of the product and it is added when about 60 to 75% of the monomer has been converted to polymer.

4. The process of claim 3 wherein the aromatic polymer is polystyrene and the rubbery polymer is syrene-butadiene rubber.

5. The process of claim 1 wherein the polymerization is carried out in aqueous suspension.

6. The process of claim 5 wherein a suspending agent is first added when at least 20% of the aromatic monomer has reacted.

7. The process of claim 5 wherein a second stage catalyst and a blowing agent are first added when at least 50% of the monomer has reacted.

8. The process of claim 5 carried out in two stages wherein first stage and second stage catalysts are added intially.

References Cited
UNITED STATES PATENTS

| | | | |
|---|---|---|---|
| 2,816,827 | 12/1957 | Roth | 260—2.5B |
| 2,857,339 | 10/1958 | Colwell | 260—2.5B |
| 2,857,340 | 10/1958 | Colwell | 260—2.5B |
| 2,864,778 | 12/1958 | Mladinich | 260—2.5B |
| 3,192,169 | 6/1965 | Doak | 260—2.5B |
| 3,284,542 | 11/1966 | Carrock et al. | 260—4 |

SAMUEL H. BLECH, Primary Examiner

M. FOELAK, Assistant Examiner

U.S. Cl. X.R.

260—4, 93.5, 880